US010682911B2

United States Patent
Candelore

(10) Patent No.: US 10,682,911 B2
(45) Date of Patent: Jun. 16, 2020

(54) ACTIVE WINDOW FOR VEHICLE INFOMATICS AND VIRTUAL REALITY

(71) Applicant: Sony Corporation, Tokyo (JP)

(72) Inventor: Brant Candelore, Escondido, CA (US)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 15/046,804

(22) Filed: Feb. 18, 2016

(65) Prior Publication Data

US 2017/0240047 A1   Aug. 24, 2017

(51) Int. Cl.
| | |
|---|---|
| B60K 35/00 | (2006.01) |
| B60J 3/04 | (2006.01) |
| G06F 3/01 | (2006.01) |
| G02B 27/01 | (2006.01) |

(52) U.S. Cl.
CPC .............. B60K 35/00 (2013.01); B60J 3/04 (2013.01); G02B 27/01 (2013.01); G06F 3/011 (2013.01); *B60K 2370/1438* (2019.05); *B60K 2370/21* (2019.05); *B60K 2370/27* (2019.05); *B60K 2370/77* (2019.05); *G02B 2027/013* (2013.01); *G02B 2027/014* (2013.01); *G02B 2027/0138* (2013.01)

(58) Field of Classification Search
CPC ............ B60K 35/00; B60K 2350/2095; B60K 2350/1028; B60K 2350/2013; B60K 2350/921; B60J 3/04
See application file for complete search history.

(56) References Cited

U.S. PATENT DOCUMENTS

| | | | |
|---|---|---|---|
| 6,731,436 B2* | 5/2004 | Ishii | G02B 27/01 348/115 |
| 7,423,553 B2 | 9/2008 | Yokokohji et al. | |
| 7,920,102 B2* | 4/2011 | Breed | B60K 35/00 340/991 |

(Continued)

FOREIGN PATENT DOCUMENTS

| | | |
|---|---|---|
| CN | 1495411 A | 5/2004 |
| CN | 101902598 A | 12/2010 |

(Continued)

OTHER PUBLICATIONS

Shigeru Nagai et al., "A Navigation System Using Live Video", NTT R&D, Japan, The Telecommunication Association, Jan. 10, 2000, vol. 49, No. 1, pp. 25 to 30.

(Continued)

*Primary Examiner* — Jelani A Smith
*Assistant Examiner* — Majdi Alsomiri
(74) *Attorney, Agent, or Firm* — John L. Rogitz

(57) ABSTRACT

A camera on a vehicle captures an image of the surroundings, and the image is presented in a window of the vehicle that is established by a transparent display such as an OLED display or transparent LCD display. The image from the camera is presented on the display according to the angle of the camera with respect to the vehicle, such that an occupant of the vehicle sees the image on the window substantially in the same relative location with respect to the surroundings as the occupant would see looking at the objects in the image through the window. In other embodiments images from a database are presented on the window superimposed onto background objects seen through the window.

14 Claims, 3 Drawing Sheets

(56) References Cited

U.S. PATENT DOCUMENTS

| | | | |
|---|---|---|---|
| 8,412,413 B1* | 4/2013 | Stark | G02B 27/01 340/980 |
| 8,521,411 B2 | 8/2013 | Grabowski et al. | |
| 2003/0112132 A1* | 6/2003 | Trajkovic | B60K 35/00 340/435 |
| 2003/0128436 A1* | 7/2003 | Ishii | G02B 27/01 359/630 |
| 2003/0169213 A1* | 9/2003 | Spero | G02B 5/20 345/7 |
| 2004/0176925 A1* | 9/2004 | Satoh | G06F 3/0325 702/150 |
| 2005/0264433 A1* | 12/2005 | Yokokohji | G01C 21/365 340/937 |
| 2007/0057781 A1* | 3/2007 | Breed | B60K 35/00 340/457.1 |
| 2010/0253493 A1 | 10/2010 | Szczerba et al. | |
| 2012/0050138 A1 | 3/2012 | Sato et al. | |
| 2014/0168608 A1 | 6/2014 | Disley | |
| 2014/0178029 A1 | 6/2014 | Raheman et al. | |
| 2014/0180508 A1 | 6/2014 | Zaneboni et al. | |
| 2014/0309864 A1* | 10/2014 | Ricci | H04W 48/04 701/36 |
| 2015/0202962 A1 | 7/2015 | Habashima et al. | |
| 2015/0291032 A1* | 10/2015 | Kim | B60K 37/06 701/36 |
| 2016/0176372 A1* | 6/2016 | Kim | E05F 15/73 701/49 |

FOREIGN PATENT DOCUMENTS

| | | |
|---|---|---|
| JP | H1165431 A | 3/1999 |
| JP | H11271060 A | 10/1999 |
| JP | 2004354792 A | 12/2004 |
| WO | 2016004998 | 1/2016 |

OTHER PUBLICATIONS

Ando, Yuji, et al., "Image Generation and Correction for Projection-based See-through Pillar", IEICE Technical Report, The Institute of Electronics, Information and Communication Engineers, , Jan. 8, 2009, vol. 108, No. 379, pp. 51-55, Japan.

* cited by examiner

ACTIVE WINDOW FOR VEHICLE INFOMATICS AND VIRTUAL REALITY

TECHNICAL FIELD

The application relates generally to active windows for vehicles.

BACKGROUND

Vehicles have a significant amount of surface area occupied by window glass. For example, vehicles have relatively large windshields, side windows, rear windows, and sunroofs.

SUMMARY

As understood herein, vehicle window glass is passive and otherwise unused to present information. As also understood herein, active vehicle window glass can present video, images, text, and other information while retaining the capability to be transparent or opaque as desired.

Accordingly, an apparatus includes at least one computer memory that is not a transitory signal and that in turn includes instructions executable by at least one processor to receive an image from a camera mounted to capture the surroundings of the vehicle. The instructions are executable to access data representing orientation of the camera relative to the vehicle, and based at least in part on the data representing orientation of the camera relative to the vehicle, present an object on a display on the vehicle.

In an embodiment of be invention, a method Includes processing the image displayed to compensate for the sloping and angles of the vehicle glass for the interior occupant. In this way, an occupant of the vehicle sees be image on the window substantially as if looking at the image straight-on.

In examples, the display is a window of the vehicle. The display may be a transparent organic light emitting diode (OLED) display. Or, the display may be a transparent liquid crystal display (LCD). Yet again, the display may not be a window of the vehicle at ail, and may be opaque, e.g. the dome roof of the vehicle or the vehicle front dash or side panels The image can be generated by the camera. In other embodiments, the image is not generated by the camera and instead, is selected from a database using object recognition of at least one object in at least one image from the camera. In yet another embodiment, the image is generated by the camera with certain objects and scenes composited in the image. The resulting image being a blend of the outside surroundings and synthetic objects.

In other embodiments, be image is not generated by the camera, and is selected from a database of scenery and panoramas. The image can change as to reflect movement of the vehicle through the scenery and panorama.

In another aspect, a method includes imaging, using a camera, surroundings of a vehicle to generate at least one image, and presenting the image on at least one window of the vehicle according to an angle of the camera with respect to the vehicle. In this way, an occupant of be vehicle sees the image on the window substantially in the same relative location with respect to the surroundings as the occupant would see looking at the objects through the window.

In another aspect, an assembly includes a motor vehicle, at least one camera mounted on the vehicle, and at least one display mounted on the vehicle at occupant eye level. At least one processor is configured with instructions to receive data including at least an orientation datum representing an orientation of the camera relative to the vehicle. The processor is configured to present at least one image on the display based thereon.

In another aspect, an apparatus includes a display configured to match the curvatures and contours of a vehicle window. The display is able to render text, video and images to interior occupants of the vehicle. The display is a transparent organic light emitting diode (OLED) or a transparent liquid crystal display (LCD).

The details of the present application, both as to its structure and operation, can best be understood in reference to the accompanying drawings, in which like reference numerals refer to like parts, and in which:

DETAILED DESCRIPTION

Figure 1:
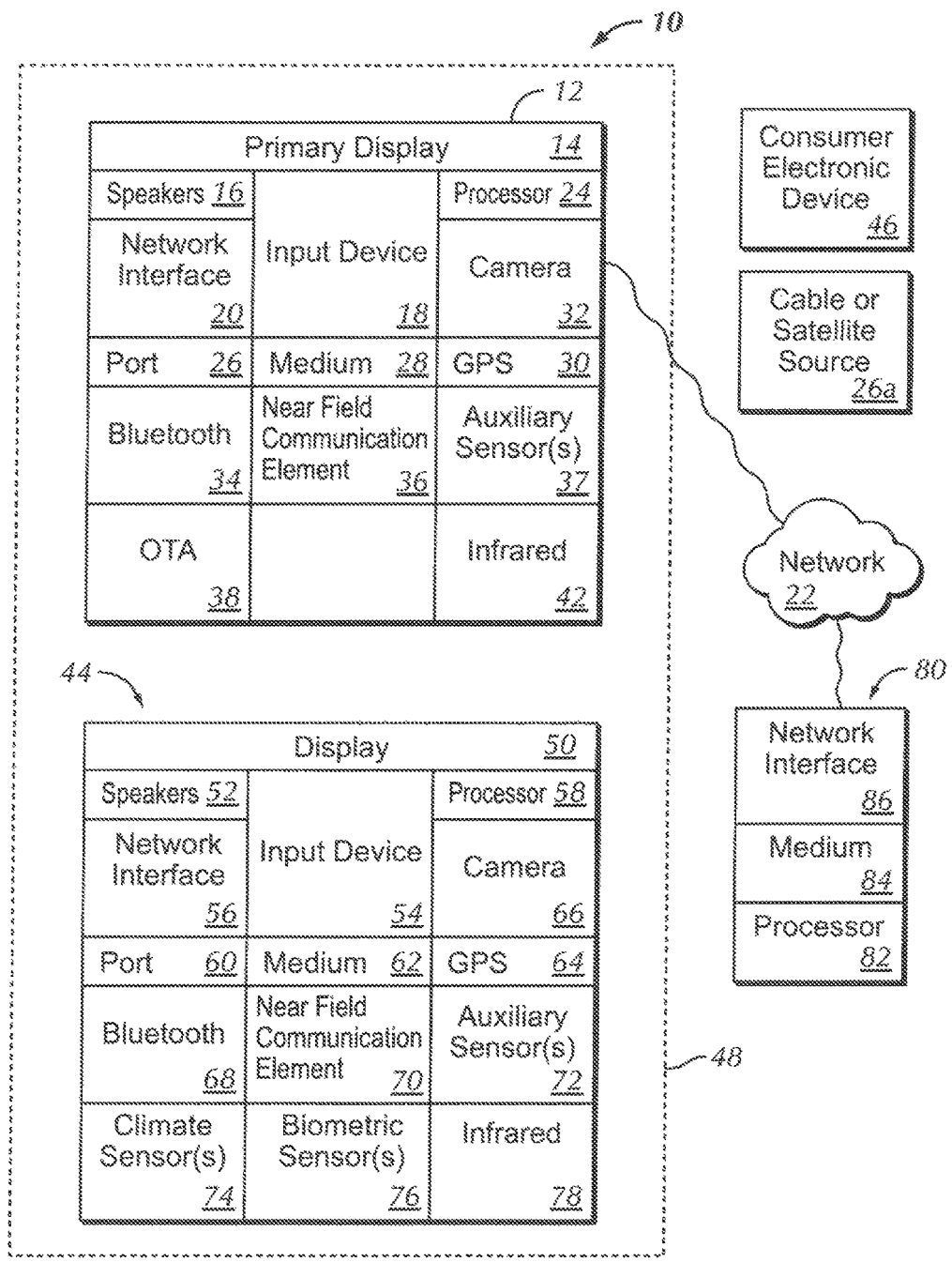
FIG. 1 is a block diagram of an example system including an example in accordance with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local Intranet or a virtual private network. A sever or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined, together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 alternatively may also be a computerized internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein). The AVDD 12 with some or all of the components shown in FIG. 1 may be mounted in or integrated into a vehicle as described further below. The vehicle may be a motor vehicle such as a car or truck that has a steering wheel for a person to drive the vehicle with or it may be a motorized driverless vehicle without a steering wheel or other means for a human to control the vehicle.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note be network interface 20 may be, e.g., a wired or wireless modem, or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interlace (HDMI) port or a USB port to physically connect (e.g. using a wired connection) to another CE device and/or a headphone port to connect headphones to be AVDD 12 for presentation of audio from the AVDD 12 to a user through the headphones. For example, the input port 26 may be connected via wire or wirelessly to a cellular broadcast, cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state, storage that are not transitory signals, in some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used k accordance with present principles to e.g. determine the location of the A VDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12, In one example, a first device 44 may be implemented by a built-in vehicle computer system. A second device 46 may include similar components as the AVDD 12 or the first device 44 and hence will not be discussed in detail. Fewer or greater devices may be used than shown.

In the example shown, to illustrate present principles ail three devices 12, 44, 46 are assumed to be members of a local network in, e.g., a vehicle 48, illustrated by dashed lines.

The example non-limiting first device 44 may include one or more displays 50 that may be touch-enabled for receiving user input signals via touches on the display. The display 50 may be a transparent active display configured as one of the windows of the vehicle 48.

In one example, the display itself is configured as safety glass suitable for relevant vehicle regulations. In other embodiments, the display 50 may be a flexible organic light emitting diode (OLED) display that is overlaid onto a standard vehicle window. Transparent liquid crystal displays (LCD) may also be used. Transparent projection screens may also be used.

The first device 44 may include one or more speakers 52 for outputting audio in accordance with present principles, and at least one additional input device 54 such as e.g. m audio receiver/microphone for e.g. entering audible commands to the first device 44 to control the device 44. The example first device 44 may also include one or more network interfaces 56 for communication, over the network 22 under control of one or more vehicle processors 58 such as an engine control module (ECM). Thus, the Interface 56 may be without limitation Wi-Fi transceiver, which is an example of a wireless computer network interlace, including mesh network interfaces. It is to be understood feat the processor 58 controls be first device 44 to undertake present principles, including the other elements of the first device 44 described herein such as e.g. controlling the display 50 to present Images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to be foregoing, the first device 44 may also include one or more input ports 60 such as, e.g., a HDMI port or a USB port to physically connect (e.g., using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or OPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, and/or a camera integrated into the vehicle 48 in which the first device 44 is contained and controllable by the device, processor 58 to gather pictures/images and/or video in accordance with present principles. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor SS, In addition to the foregoing, it is noted that in some embodiments the first device 44 may also include an infrared (IR) transmitter and/or IR receiver and/or IR transceiver 42 such as an IR data association (IRDA) device. A battery such as a vehicle battery (not shown) may be provided, for powering the first device 44. The device 44 may communicate with the AVDD 12 through any of the above-described communication modes and related components.

The components of the in-vehicle device 44 may or may not be enclosed within a common housing.

The second device 46 may include some or all of the components described above.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The active display 50 may be controlled by any one of the components 12, 44, 46, 80 described above, alone or acting in cooperation with other devices. For example, images may be communicated from the AVDD 12 to the ECM processor 58 over WiFi or Bluetooth, for instance, for presentation on the window-like display 50. Or, the ECM processor 58 may present the images using input from the vehicle camera 66. Yet again, the images presented on the window-like display may originate from the server 80 and be seat to the ECM processor 58 using WiFi or wireless telephony transmission for presentation on the window-like display 50.

As understood herein, active displays can be configured with curvatures, shapes, sizes, and thicknesses appropriate for a vehicle window. Presenting images on vehicle windows may be particularly advantageous with the advent of driverless cars, in which none of the riders of the vehicle need pay attention to the navigation of the vehicle through space. Thus, the vehicle 48 shown in FIG. 1 may be a driverless vehicle.

The window-like active display 50 may present video such as movies and/or web pages as if the display is a computer screen or tablet.

As further understood herein, content presented on the window-like display 50 can be "virtualized" to augment the natural view seen through the transparent display 50. For example, text may be superimposed on outside images to identify landmarks and interesting items in the view. The outside world may be rendered in "virtual reality" to simplify navigation of the outside world. "Reality" as seen through the window-Like display 50 may be enhanced to allow amusing things to happen, e.g., presenting an image of a dinosaur peering out from between two trees or boulders, or superimposing images of grass, lakes, and flowers onto a desert landscape through which the vehicle 48 is passing and which the occupants of the vehicle see through the transparent display 50. Other example images that may be presented on the window display 50 superimposed onto natural objects that can be seen through the window display 50 include an image of skier superimposed on a natural mountain, or art image of a blimp circling around with a banner lite up showing text.

In some embodiments, the AVDD camera 32 or vehicle device camera 66 may be used to capture images outside the vehicle 48, with the images then being rendered on the display 50 by, e.g., the vehicle processor 58 at locations on the display 50 corresponding to the azimuth and elevation at which the earners was oriented when it captured the images. If desired, the image can be processed and "enhanced" by the vehicle processor 38 or AVDD processor 24 before being presented on the window displays.

Figure 2:
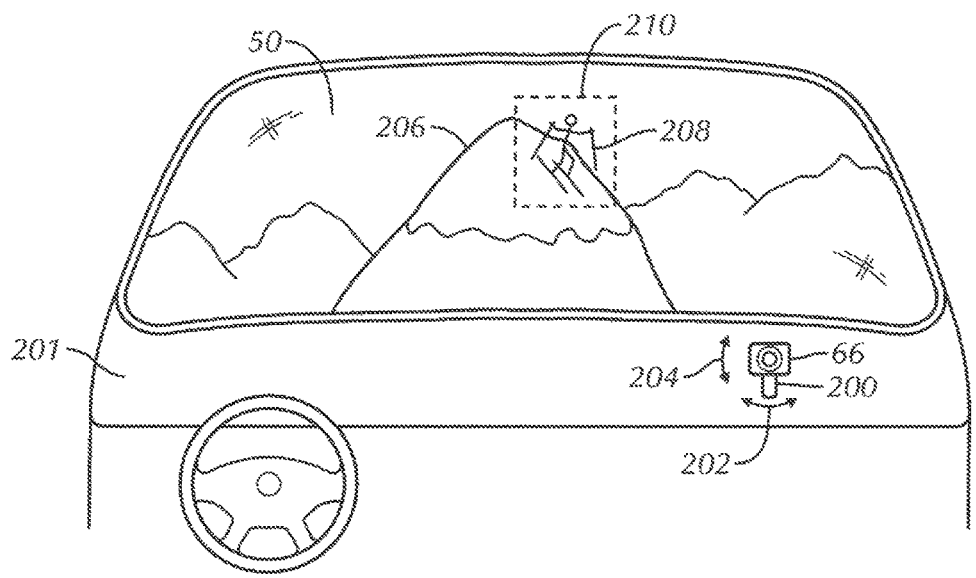
FIG. 2 is a schematic diagram of a window display in a vehicle showing an image presented on the window display and a physical object as would be viewed through the window, with a display region shown in dashed lines.

FIG. 2 illustrates an example of the above principles. The camera 66 shown in FIG. 1 may be coupled to one or more motors 200 to move the camera 66 relative to a vehicle 201 in which, the camera is disposed, with, the window display 50 establishing the front windshield of the vehicle in the non-limiting example shown. One or more window displays 50 may establish the rear window and side windows of the vehicle as well and operate according to present principles.

The one or more motors 200 may rotate the camera in the horizontal, or azimuthal, dimension indicated by the arrows 202 and/or in the vertical, or elevational, dimension indicated by the arrows 204. The angle of the camera relative to, e.g., the heading of the vehicle 201 in one or both of these dimensions may be detected by, e.g., one or more encoders coupled to the one or more motors 200 and sent to the vehicle processor 58. Or, if the camera is fixedly attached within the vehicle at a particular elevational and azimuthal angle, the angles can be programmed into the processor 58. The camera may also be mounted on top of the vehicle capturing a 360 degree view all around the vehicle. The view from inside the vehicle would be adjust adjusted up. The azimuth angles can be tracked by the processor 58.

As shown in FIG. 2, background physical objects in the vehicle's physical surroundings such as the mountain 206 shown may be viewed by occupants of the vehicle through the window display 50, since the window display 50 may be made of a transparent OLED or LCD or other type of active display. According to one or more of the techniques described below, the processor 58 may present an image such as the example skier image 208 in a region 210 of the window display 50 such that the image 208 appears to be superimposed on the physical object 206. The region 210 in which the image 208 is presented may be based at least in part on data representing the orientation of the camera relative to the vehicle. As set forth further below, however, the image 20B may or may not be generated by the camera 66.

Figure 3:
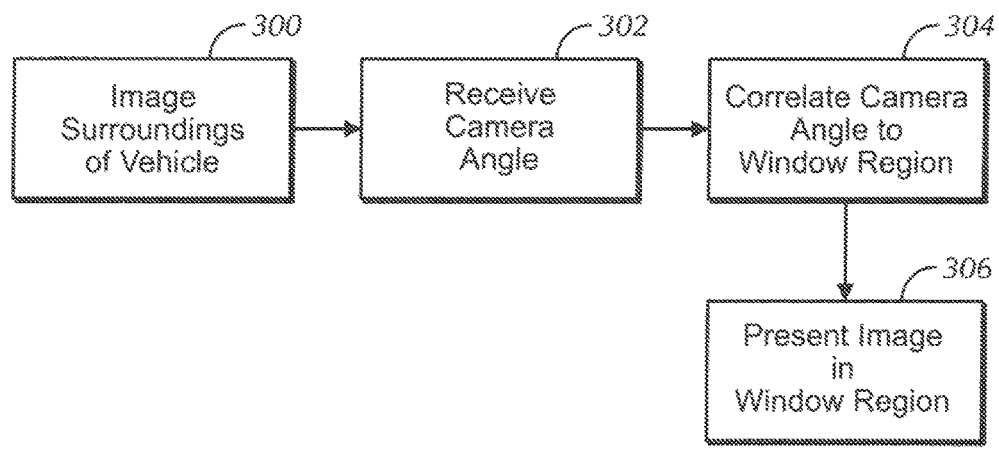
FIG. 3 is a flow chart of example logic according to one embodiment.

FIG. 3 illustrates logic that may be executed by any one or more of the processors herein for generating the image 208 rising the camera 66. Commencing at block 300, the camera is used to image the physical surroundings of a vehicle to generate at least one image such as the image 208 of at least one physical object in the physical surroundings. The orientation of the camera 66 relative to the vehicle 201 in the azimuthal and/or elevational dimensions is accessed, at block 302. This orientation is correlated to the window region 210 at block 304.

In an embodiment, the window region 210 is determined to be the region of the window display 50 out of which a viewer positioned at the location of the camera 66 and looking out the window at the same angular orientation relative to the vehicle would view, in other embodiments, the assumed viewer location may be from the driver's seat or passenger seat, with the angular orientation used to select the region 210 being offset to account for parallax between the assumed viewer location and the actual location of the camera, which can be programmed into the processor 58.

The assumed viewer location may be dynamically selected using, for example, signals from seat sensors in the vehicle. The same seat sensors that signal the ECM whether a person is sitting in a vehicle seat for purposes of seat belt warning signals may fee used. Thus, if only the driver seat is indicated as being occupied, the assumed viewer position may be the driver's seat whereas if both the driver's seat and passenger seat are occupied, the assumed viewer location, may default to the passenger seat unless the occupant of the vehicle overrides the default to indicate otherwise. Yet again, if any seat behind the driver is occupied, the default assumed viewer location may be from the back seat that is occupied.

Proceeding from block 304 to block 306, the image 208 is presented on at least one window of the vehicle and preferably in the region 210 according to an angle of the camera with respect to the vehicle that is accessed at block 302. In this way, an occupant of the vehicle sees the image 208 on the window display 50 substantially in the same relative location with respect to the surroundings 206 as the occupant would see looking at the objects in the image through the window. In an alternative embodiment, the camera 66 is mounted on top of the vehicle to provide 360 degree images of the surroundings. In this embodiment, the image 208 in the window display 50 may appear slightly shifted up especially scenery that is close by the vehicle.

Figure 4:
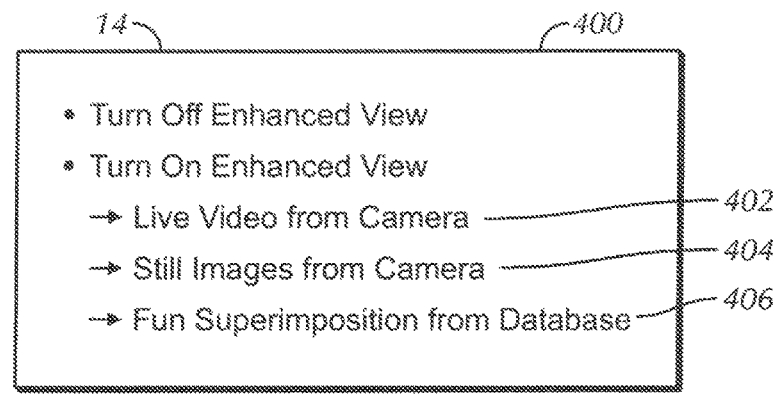
FIG. 4 is a screen shot of an example user interface (UI) for selecting enhanced viewing.

FIG. 4 is an example screen shot of a user interface that may be presented on any of the displays shown herein, including the display 14, to select various operations disclosed herein. The selections can be communicated to the processor controlling the window display 50.

As shown at 400, the user may be given the option to disable the logic herein and instead employ the window display 50 exclusively as a transparent window, with no images presented thereon. The user may also be provided with a video selector 402 to enable the logic from FIG. 3 to present video images in accordance therewith and with a photo selector 404 to enable the logic from FIG. 3 to present a photographic still image in accordance therewith. The user may also be provided with a fun selector 406 to enable the logic of FIG. 5.

Figure 5:
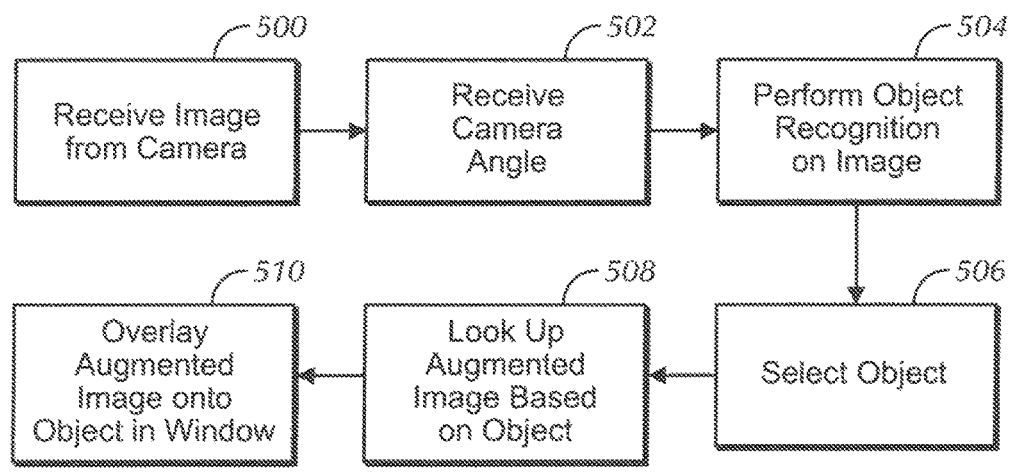
FIG. 5 is a flow chart of example logic according to another embodiment.

Accordingly and turning now to FIG. 5, at block 500 an image from the camera 66 may be received. If desired, at block 502 the camera orientation relative to the heading of the vehicle may be received. Object recognition may be perforated at block 504 on one or more objects in the image from the camera.

In one embodiment, the object selected for further processing at block 506 is the largest object in the image, as determined by boundary recognition. In another embodiment, the selected object may be the brightest object or the object with the greatest variety of color in it as indicated by histogram analysis. Or, the object that is centermost in the image may be selected.

Once an object has been selected, the logic moves to block 508. At block 508, the name or other description of the object may be used as an entering argument to, e.g., a lookup table or other data structure to select an image corresponding to the object. For example, if the selected object is "mountain", the data structure may correlate that to an image of a skier, or of a dinosaur peering over the peak of a mountain. Yet again, the image may be text of the mountain name and other characteristics. If multiple images are correlated to the object, the processor may randomly select one. Then, the image is presented at block 510 in the region 210 of the window display 50 corresponding to the camera angle to augment, in a whimsical way or in an informational way, superimposed on the physical object seen through the window.

Alternatively, the light could come directly from the outside through the window displays with zones and segments being activated to enhance the "live" image.

Although the light received from the outside the window display 50 may be somewhat occluded by the display pixels, the display remains "transparent" and this may be acceptable as many people tint their car glass fairly dark as it is.

While disclosure above focused on a display 50 embodied as a window of the vehicle, the other surfaces in the vehicle may be made of transparent display material as well to make a seamless view to allow, for example, a viewer to look down at the floor of the vehicle and see images that would correspond to a view in that direction.

In another embodiment, the vehicle may be provided with no transparent windows at all, instead, opaque displays may be mounted in the positions that transparent windows ordinarily would be placed, and multiple cameras 66 positioned on the vehicle to image substantially 360 degrees around the vehicle, generating images on the opaque displays that render images of the "outside world" inside the vehicle. The inside dome of the car could all be display which could be curved display glass or project images.

Indeed, if the vehicle is a driverless vehicle, it may not be capable of being driven by a human. In such an environment, there may not be any need to render the real environment in the vehicle—even for safety reasons. Thus, no images of the physical objects of the vehicle need be rendered. Instead, fanciful images or movies can be presented on opaque displays that surround the passenger compartment where windows ordinarily would be. For instance, a "Mars approach" program may be selected in which images of stars, the earth, the sun and Mars looming ahead are shown on the opaque displays. Accompanying audio may inform the occupants of an impending arrival arriving at a Mars orbital position in "X" miles.

Not all such virtual scenarios need be about travelling. For example, while sitting in a driverless vehicle with opaque displays in place of transparent windows, a video as would be seen by a person sitting by a brook in a clearing with birds chirping may be played, or another nature view may be played.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. At least one apparatus comprising:
   at least one computer memory that is not a transitory signal and that comprises instructions executable by at least one processor to:
   receive an image from a camera on a vehicle of background surroundings of the vehicle;
   access data representing a first orientation of the camera relative to the vehicle;
   based at least in part on the data representing the first orientation of the camera relative to the vehicle, present a first object on a display on the vehicle;
   cause the camera to move relative to the vehicle;

access data representing a second orientation of the camera relative to the vehicle;

based at least in part on the data representing the second orientation of the camera relative to the vehicle, present a second object on a display on the vehicle;

present at least one user interface (UI) with a first selector selectable to enable and/or disable presenting images from the camera on the display, a second selector selectable to cause video to be presented on the display, an option to cause still photographs to be presented on the display, and an option to cause the processor to correlate a third object in the image to a physical object in surroundings of the vehicle and at least in part based on correlating the third object in the image to the physical object, superimposing the third object in the image onto the physical object.

2. The apparatus of claim 1, wherein the display is a window of the vehicle.

3. The apparatus of claim 2, wherein the display is one of a transparent organic light emitting diode (OLED) display and a transparent liquid crystal display (LCD).

4. The apparatus of claim 1, wherein the display is a sunroof of the vehicle.

5. The apparatus of claim 1, wherein the display is not a window of the vehicle.

6. The apparatus of claim 1, comprising the at least one processor.

7. At least one apparatus comprising:

a display configured to match the curvatures and contours of a vehicle window;

the display able to render text, video and images to interior occupants of the vehicle;

the apparatus being configured with instructions executable to receive an image from a camera on the vehicle of background surroundings of the vehicle, access data representing orientation of the camera relative to the vehicle, and based at least in part on the data representing orientation of the camera relative to the vehicle, present an object from the image on the display in front of natural surroundings of the vehicle, the instructions being further executable to identify a viewer location and to offset a location of presentation of the object to account for parallax between the viewer location and a location of the camera.

8. The apparatus of claim 7, wherein the glass in the display conforms to regulatory safety guidelines.

9. The apparatus of claim 7, wherein the images are generated by at least one camera on the vehicle.

10. The apparatus of claim 7, wherein at least some of the images are not generated by a camera mounted on the vehicle and are selected from a database using object recognition of at least one object in at least one image from the camera mounted on the vehicle.

11. The apparatus of claim 7, wherein the display comprises at least one transparent organic light emitting diode (OLED).

12. The apparatus of claim 7, wherein the display comprises at least one transparent liquid crystal display (LCD).

13. The apparatus of claim 7, wherein the instructions are executable to:

responsive to identifying that only a driver's seat in the vehicle is occupied, establish the viewer location as a location of the driver's seat;

responsive to identifying that the driver's seat and a passenger seat in the vehicle are occupied, default the viewer location to a location of the passenger seat.

14. The apparatus of claim 13, wherein the instructions are executable to:

responsive to identifying that a seat in the vehicle behind the driver's seat is occupied, default the viewer location to a location of the seat in the vehicle behind the driver's seat that is occupied.

* * * * *